United States Patent [19]

Amon et al.

[11] Patent Number: 4,756,759

[45] Date of Patent: Jul. 12, 1988

[54] PRINTING INK IN DRY, POWDERED FORM

[75] Inventors: Albert Amon; Haim Bretler, both of Lausanne, Switzerland

[73] Assignee: SICPA Holding S.A., Glarus, Switzerland

[21] Appl. No.: 27,151

[22] Filed: Mar. 17, 1987

Related U.S. Application Data

[63] Continuation-in-part of Ser. No. 698,683, Feb. 5, 1985, abandoned.

[51] Int. Cl.$^4$ ............................................. C09D 11/14
[52] U.S. Cl. ........................................ 106/23; 106/25; 106/26; 106/27; 106/30; 106/31; 106/500; 106/501; 523/160
[58] Field of Search ............... 106/25, 26, 27, 30, 106/, 31, 23, 308 C, 308 F, 308 M, 309, 19, 23; 523/160, 161; 260/DIG. 38

[56] References Cited

U.S. PATENT DOCUMENTS

| | | | |
|---|---|---|---|
| 3,287,290 | 11/1966 | Bray, Jr. ........................... | 524/46 |
| 3,925,219 | 12/1975 | Strong ............................ | 252/62.1 P |
| 3,965,022 | 6/1976 | Strong et al. ................... | 252/62.1 P |
| 4,391,648 | 7/1983 | Ferrill, Jr. ...................... | 106/308 M |

*Primary Examiner*—Amelia Burgess Yarbrough

[57] ABSTRACT

A method for preparing a flexographic or gravure printing ink in dry, powdered form. The method comprises comminuting a blend of all ink components, the solvents excluded, under oxygen free and temperature controlled conditions. The powder obtained is homogeneous, dust free, solid, dry and free-flowing and provides a ready-for-use printing ink on simply stirring with the normally used solvents.

11 Claims, No Drawings

PRINTING INK IN DRY, POWDERED FORM

This patent application is a continuation-in-part of patent application Ser. No. 698,683 filed Feb. 5, 1985 now abandoned.

BACKGROUND OF THE INVENTION

The instant invention belongs to the field of printing, especially flexographic and gravure printing, and it is related to printing inks for this technical use.

Printing inks for gravure and flexographic printing have already been known for a rather long time. These inks comprise the following principal components:
- at least one pigment, preferably an organic pigment;
- at least one binder, preferably naturally occuring or synthetic resins or rosins; and
- a solvent system.

Further optional components are fillers, optical brighteners, plasticizers, drying promoters, viscosity regulators, extenders, surface active agents, antifouling agents, etc.

Normally, these printing inks are rather of low viscosity, and the solvent system is relatively highly volatile. The drying of these printing inks in the printing process is based on the rapid evaporation of the solvent. After solvent evaporation, the binder (i.e. the resins) fix the finely divided pigments on the printed substrate. A good solubility of the binder in the solvent is very important, and any interaction between the ink solids, especially the binder, and the solvent molecules must remain as low as possible in order not to interfere with the drying process.

The desired rapid evaporation of the solvent generally excludes the use of water as a solvent. However, for special purposes, an organic solvent may be used which contains small amounts of water. Thus, "solvent", "solvent phase" or "solvent system" as used herein means at least one liquid organic compound, free of water under the conditions of normal use but which has not been specially dried and which may thus contain minor, random amounts of water, typically not more than about 2% by weight.

Flexographic and gravure printing inks are employed in the printing of various substrates such as paper and cardboard, particularly for packaging purposes; coated papers such as for prospectuses and illustrated newspapers and magazines; high quality printing paper such as for art reproductions; plastic films and sheets, especially for flexible packaging; laminates of transparent plastic films, for example made of polyester, polypropylene, hydrated cellulose ("Cellophane"), polyethylene, polyvinyl chloride, etc; aluminum foil and paper or plastic laminated aluminum films.

Normal and well known printing inks of the kind which are treated herein, are composed of about 10 to 60% by weight, based on the total weight of the ink, of total solids (i.e. all components, the solvent system expected), and 90 to 40% of the solvent or solvents. A preferred range is 20 to 50% by weight of total solids, and most inks contain 25 to 30% of solids, the remainder being essentially the solvent phase. As a solvent phase, any organic compound or compound mixture can be used which shows the necessary properties as a liquid vehicle for the printing ink, namely especially
- good dissolving power of the solid ink components, in particular the binder;
- an evaporation rate sufficiently high and, at the same time, a boiling point or boiling range sufficiently low to ascertain the necessary drying rate;
- chemical properties which are compatible with the intended use of the ink such as freedom of corrosive actions and low toxicity,
- chemical stability and compatibility with the other components of the printing ink.

Solvents useful for gravure and flexographic printing inks which are considered here, can be selected from a great number of organic liquids well known to the man skilled in the art. Examples for such liquids having in general a low boiling point, are the following: aliphatic hydrocarbons such as hexane, heptane, octane, cyclohexane, cycloheptane, and the different "boiling range" gasolines ("50/70", "60/80", "60/90" etc) where the figures denote the beginning and the end of boiling in °C.; alcohols such as methanol, ethanol, n-propanol, i-propanol; ketones such as acetone, methyl ethyl ketone, methyl isobutyl ketone; aromatic hydrocarbons such as toluene and xylene; aliphatic esters such as ethyl acetate, propyl acetate, isoproyl acetate; etc., and halogenated hydrocarbons, and mixtures of these liquids. The man skilled in the art is familiar with the choice of the particular printing ink solvent system.

Until now, flexographic and gravure printing inks have been manufactured according to a special method. First of all, the pigment which is supplied in powder form but which always tends to aggregate, is "formed" and prepared for the use in the ink. To do this, about equal parts of such a pigment and of a binder resin are ground together in a ball mill with the addition of some plasticizer and liquid solvent, until the aggregates have been broken up and the resin has formed a thin coating on every one of the pigment particles. Finally a liquid mass is obtained which is then further diluted with more solvent, under vigorous stirring, in special kettles until the final concentration is obtained. Before or during this further dilution, the other ink additives can be added to the liquid mixture.

The printing ink thus obtained is then transferred from the kettle into drums or other suitable containers and shipped to the printing houses where the ink will normally be stocked some time before use.

There are some problems associated with this process. First of all, the ball milling of pigments and resin is a time and energy consuming operation.

Secondly, the shipment of rather great quantities of liquid ink where about at least 75% by weight are highly inflammable solvents, is hazardous and very dangerous. Furthermore, relatively large containers must be used for shipping and the stockage of the liquid ink. Then, a great amount of solvents is to be shipped whereas normally, solvents are available everywhere and in particular at the location of the printing facilities. Finally, the stocked ink must be stirred before use since it may be possible that a portion of the solids, primarily the pigments, has settled and must be redispersed.

Dry, solid, powdery printing inks for gravure or flexographic printing which are to be reconstituted just before use by the addition of the solvents, have not been reported until now and are unknown to the printer. As will be described later on in more detail, this fact is not surprising since the man skilled in the art knew that the only technique of preparation of the ink was a wet one. It could not be imagined how pigments can be "formed" and incorporated into the printing ink formulation other than by a wet grinding step. Furthermore, the man skilled in the art knew that the sequence of addition of the components could not be selected at will but that a certain, predetermined sequence had to be imperatively observed.

For all these reasons, powdery flexographic and gravure printing inks are unknown until now.

Bray (U.S. Pat. No. 3,287,290) discloses a spray-dried paint composition. Of course, bearing in mind what has been said above, ink powders are not disclosed nor suggested.

Ferrill (U.S. Pat. No. 4,391,648) describes a pigment composition comprising 25 to 95% pigment and 5 to 75% resin. Inks are not disclosed nor suggested. Ferrill's composition can be used as one of the starting products (pre-dispersed pigment) in this invention.

Strong (U.S. Pat. No. 3,925,219) discloses a pressure-sensitive developing powder which has nothing to do with this invention and cannot be used for printing inks. The same applies to the disclosure of U.S. Pat. No. 3,965,022 (Strong et al.).

SUMMARY OF THE INVENTION

The first and most important object of this invention is to obviate all the above listed drawbacks and to provide a solvent-free flexographic and gravure printing ink in the form of a dry, free-flowing powder which, by addition of a solvent system and by appropriate mixing, will give a ready-for-use, reconstituted printing ink having the same utilisation properties as a liquid printing ink prepared by the methods of the prior art, described above, beginning with pigment ball milling.

A second, important object of the invention is a new and useful method for preparing the new dry powdered ink mentioned above. In fact, since the sequence of the individual steps of manufacturing the known printing inks is deemed to be important and crucial for the result, and the sequence of the addition of the components is important too, the only appropriate method the man skilled in the art could imagine would be to follow the known preparation and to evaporate the solvent in order to recover the solids of the ink. It is evident, however, that such a method would by no means be acceptable for economical and ecological reasons.

Quite surprisingly, it has now been found that the new dry printing ink powder, first and principal object of this invention, is obtained by the new method. Generally speaking, the method is based on a dry comminuting of materials in a protected atmosphere, so-called pigment chips being used as one of the solid starting materials, all printing ink ingredients being solid at normal temperature and pressure.

The dry printing ink powder obtained by this process has a particle size of up to about 300 micrometer, i.e. 0.30 mm. During the powder preparation process, it is possible that not only a comminuting but also a kind of agglomeration may occur in the course of the purely mechanical treatment of the starting materials. The dry ink finally obtained is quite surprisingly perfectly fitted for reconstituting a printing ink on stirring it together with the necessary amount of the organic solvent. This is surprising since it has been strongly believed until now that it is necessary, in order to prepare a suitable printing ink, to first mill the pigment thoroughly together with binder resin and some solvent, i.e. to begin with a wet milling operation, and that the sequence of adding the other ink ingredients is also crucial. Sedimentation tests have shown that the printing ink prepared from the powder of the invention has the same good properties than the ink obtained by the well known "wet" process.

DETAILED DESCRIPTION OF PREFERRED EMBODIMENTS

The printing ink prepared from the powder of the invention does normally not differ in composition from the known inks. This means that the invention does not suggest the use of new materials or substances for printing inks. Thus, the hitherto known starting substances can also be used for the now dry ink, with the important exception however that no substances must be present which are liquid at normal temperatures. For example, liquid plasticizers such as dibutyl phtalate have to be replaced by solid ones such as cyclohexyl citrate. However, very minute amounts of liquid plasticizers may nevertheless be used, up to about 2.5% of the dry ink composition, when this use cannot be avoided as in the case of plasticized nitrocellulose. Nitrocellulose is normally plasticized with DOP (dioctyl phtalate); in the pure, dry state, it is explosive.

Since starting materials are used which are identical to the products used until now (with the exception just mentioned), it will not be necessary to describe in detail these materials or substances which can easily be found in the date books of the art. The very purpose of this invention is thus not to provide new inks but to provide the inks already in use, as a new and useful dry composition allowing their reconstitution shortly before the printing step.

The method of the invention will now be described more in detail.

The dry free-flowing ink composition of this invention is essentially composed of materials which are solid at room temperature and normal atmospheric pressure.

The method of the invention comprises essentially the purely mechanical and simultaneous comminution of solid starting materials under special conditions of temperature and inert atmosphere. The starting materials are, basically, the following:

A. A pigment. The pigment may be an organic or an inorganic one. These pigments are those currently used in the printing ink industry and are well known to the one skilled in the art. Non-limiting examples are the phtalocyanines, Benzidine Yellow, DNA Orange, red toners, carbon black, titanium dioxide. The pigments are listed in the "Colour Index".

In the invention, the pigments are not used as such but in the form of granulated pre-dispersed pigments comprising typically 75 to 80% by weight of pigment and 25 to 20% by weight of a resin, normally nitrocellulose, known for its ability to "wet" the pigment particles. Pigment pre-dispersions are sold, for example, by Kemische Verke Koge (KVK) under the tradename "Predisol". So-called pigment chips, composed also of pigment and resin, may alternatively be used, too. The particle size of the pigment in these compositions is generally comprised between 0.1 and 2 micrometers, typically about 0.5 microns.

The particle size of the pre-dispersion granules or the chips is not critical and may be comprised in the range of 0.1 to 5 mm.

B. A binder. The binder is generally selected from film-forming resins. These binders are those currently used in the printing ink industry and are well known to the man skilled in the art. Non-limiting examples are nitrocellulose, ethyl cellulose, acrylics, vinylics, phenolics, pure or modified colophonium resins, polyesters, their mixtures and copolymers. The binder resins are listed in the printer handbooks.

The particle size of the binder—which is also solid as it has already been explained above—is not critical and may, for example, be comprised in the range of 0.5 to 5 mm.

C. Optional components.

C1. Plasticizers. Plasticizers are the most important optional components of the dry ink since they will render the finally printed pattern more flexible. In most cases, they improve the gloss and the brilliance of the pigments.

Only solid plasticizers are used. They are well known in the printing ink industry and to the men skilled in the art. Some non-limiting examples may nevertheless be cited: tricyclohexyl citrate, triphenyl phosphate, dicyclohexyl phtalate, di(hydroabietyl)phtalate, toluene sulfonamide, micronized polyethylene waxes, halogenated paraffine waxes, fatty acid amides, paraffine waxes, micronized mineral, vegetable or animal waxes, and their mixture. The amount and nature of the plasticizer is of course selected in view of the effect to be obtained and the required compatability.

C2. Extenders. Extenders can be used to give a fainter colour to the printed pattern. They are known to the man skilled in the art; non-limiting examples for extenders are calcium carbonate, barium sulfate, aluminium hydrates and silica. Since all these extenders are pigments, their particle size must be in the pigment range and therefore not exceed about 5 micrometers.

C3. Others. Further optional components are also known to the man skilled in the art and comprise optical brighteners, drying promoters (most extenders act as drying promoters), viscosity regulators, antifouling agents, surface active agents, friction resistance regulators such as micronized polyethylene waxes, halogenated paraffine waxes, paraffine waxes, micronized mineral, vegetable or animal waxes, and even fragrances. Only solid materials can be used. When the optional component is not soluble in the finally reconstituted ink, their particle size must be in the pigment range, i.e. inferior to about 5 micrometers. Otherwise, the particle sizes of the starting products are not critical and may, for example, be comprised in the range of 0.5 to 5 mm.

The amounts of all components selected to make up a certain ink—normally the same recipe as an already existing ink—are now intimately blended together. Devices known per se for solid mixing are used to blend the components, such as tumblers or double-cone mixers. See, for example, the chapter "Mixing of solids with solids" in the "Chemical Engineers' Handbook", page 1221, 3rd Ed., McGraw Hill, 1950.

When the blend is finished, the mechanical size reduction of the invention is to follow. During this size reduction step, not only the original particles are comminuted, but there is also a certain degree of interaction between all original components in the newly formed particles, so that, for example, the original resin granules now become coated on the surface, by tiny pigment particles. The plasticizer particles will also contain some pigment and resin, and the resin particles will contain plasticizer and pigment. The whole solid mass shows an homogeneous aspect after passing the size reduction device.

So, it is important for the invention that the solid components are pulverized in admixture and not separately. Separate pulverization followed by mixing will not give a dry ink which dissolves so easily and so completely as the powder of the invention.

Pulverizing is carried out in the absence of liquids and other grinding aids in an inert atmosphere and by purely mechanical means only. Thus, for example, pulverizing by melting and spraying the melt, or by dissolving the solid and spray drying the solution, is excluded.

The size reduction is carried out in devices which permit the maintaining of an inert atmosphere and which are known per se. Good results have been achieved in attrition mills such as pinned disk mills, hammer mills, jet mills and whirlwind mills. Other suitable types may also be found in the chapter "Crushing and Grinding" of "Chemical Engineers' Handbook" cited above. Continuously operating one-shot mills are preferred since a constant flow of inert gas may easily be maintained in them.

The blend to be pulverized is, in general continuously or portionwise fed to the pulverizer. Simultaneously, an inert gas stream is fed into the mill. Before starting the solids feed, the air in the mill should be displaced by the inert gas. Suitable inert gases are nitrogen and carbon dioxide. It is not necessary to specially dry the gas. It is important that at least the milling chamber remains always free from oxygen.

The solids feed rate depends on several factors such as the desired final particle size; capacity speed and power of the mill; and heat conditions. Due to the well-known low mechanical yield of comminution devices, most of the mill energy is transformed into heat. Care must be taken that there is no undue rise of temperature in the pulverizing step since there would be a risk that some components would become tacky or even melt, and the mill would be smeared. Therefore, the feed rate of the solids must be carefully controlled in order to avoid undue temperature rises. Internal or external cooliing of the mill is preferred to avoid any rise of temperature. Internal cooling can be achieved by employing a cooled inert gas stream, by pre-cooling the solids to be milled, or by adding crushed solid carbon dioxide or dry ice to the solid feed. External cooling may be achieved by providing a cooling jacket about the milling chamber and feeding it with a cooling medium.

The dry free-flowing ink powder discharged from the pulverizing device is ready for use. It should have a particle size generally comprised in the range of from 1 to 300 micrometers, typically from 1 to 200 microns, more preferably from 20 to 100 microns. Such powders are dust free, remain free-flowing, are easy to portion and to dissolve, and are not rapidly attacked by oxygen and light. The powder as discharged from the mill may, if necessary, be screened in order to remove the fines. However, in most cases, the milling operation can be controlled so as to avoid the formation of fines, generally in somewhat reducing the cooling effect.

It has been highly surprising that even nitrocellulose resins could be milled in the dry process of the invention. It is believed that the diluting effect of the other, harmless components of the mixture avoids any risk of explosion and even degradation during the milling step.

The dry ink should be kept and stored in closed opaque containers such as tins or metal lined plastic cans.

The dry ink of the invention will be dissolved just prior to use to give the desired flexographic or gravure printing ink. The normal way of dissolving is without problems. The best way is to charge at room temperature the required solvent in a stirring vessel equipped with a dispersing agitator, turning at about 1200–1500 rpm, and to add the required amount of ink powder portionwise or at once. A stirring time of about 30 minutes is fully sufficient. For example, when an ink is to be prepared having a solids content of 25%, 3 parts by weight of solvent (e.g. 30 kgs) are to be mixed with 1 part by weight (e.g. 10 kgs) of the dry ink powder.

The thus reconstituted printing inks do not differ from the hitherto used liquid inks, prepared by the supplier. The advantages of delayed solvent addition have already been discussed above.

In the following Examples, all percentages are by weight unless otherwise indicated. Temperatures are in degrees centigrade.

REFERENCE EXAMPLE A

In a suitable container, the following ingredients are charged:
(1) 200 gms of phtalocyanine pigment blue (for example Lutetia cyanine I4NS, I.C.I.) having an average particle size of about 2 micrometers;
(2) 600 gms of a nitrocellulose based varnish, comprising:
 180 gms of nitrocellulose cotton, wetted to 35% with isopropanol (A280, Worbla, Switzerland),
 40 gms of dioctyl phtalate (DOP)
 50 gms of methoxypropanol, ethoxypropanol or ethyl glycol,
 200 gms of ethanol, and
 130 gms of isopropyl acetate.

The ingredients are well blended using a disk dispersing unit, rotating at 1500 rpm during 30 minutes. The temperature rises to about 40° C. The blend is a slurry which is then continuously pumped through a continuous ball mill charged with glass microballs having a diameter of about 1 to 1.5 mm (Coball Mill, Fryma).

A pigmented paste is obtained with a hourly yield of 75 to 90 kgs.

To each 800 gms of paste, the following substances are added:
 70 gms of nitrocellulose cotton,
 50 gms of ethyl cellulose (N7, Hercules Inc.),
 500 gms of an abieto-maleic resin (Tergraf 267, RESISA) having a melting range of 130°–180° C.,
 50 gms of micronized wax (CERIDUST VP 3620, Hoechst AG),
 730 gms of ethanol,
 300 gms of methoxypropanol, and
 1000 gms of isopropyl acetate.

The mixture is put under the action of the above described dispersing unit and mixed until complete solution of the resins which takes about 30 to 40 minutes.

A dark blue printing ink is obtained having a solids content of about 28%, well fitted for gravure and flexographic printing purposes.

REFERENCE EXAMPLE B

The following components are charged into the stirring vessel as described in Reference Example A.

400 gms of pigment chips composed of 50% (200 gms) of phtalocyanine blue, 40% (160 gms) of nitrocellulose, and 10% (40 gms) of DOP; and a solvent system comprising 500 gms of ethanol, 200 gms of isopropyl acetate, and 150 gms of methoxy propanol.

After stirring at 1500 rpm for 60 minutes, the chips have dissolved, and a dark blue dispersion is obtained.

The particle size of the pigment before and after dispersion is the same and does not exceed 0.5 microns.

Under continuous stirring, other ingredients listed in Reference Example A are added, namely,
 520 gms of ethyl alcohol,
 930 gms of isopropylacetate,
 200 gms of methoxypropanol,
 500 gms of the abietic-maleic acid resin,
 50 gms of the ethyl cellulose, and
 50 gms of the micronized polyethylene wax.

After stirring for 30 minutes, a dark blue printing ink is obtained which has the same wet and dry composition as that of Reference Example A.

EXAMPLE 1

Part One. Preparation of a dry printing ink powder

In an open vessel, a dry blend is made from
(a) 250 gms of a pre-dispersed pigment composition containing 80% (200 gms) of phtalocyanine blue pigment (same particle size as in Reference Example B), and 20% (50 gms) of dry nitrocellulose,
(b) 30 gms of solid dicyclohexyl phtalate plasticizer (m.p. 66° C.),
(c) 120 gms of a resin mixture composed of 110 gms of nitrocellulose and 10 gms of dibutyl phtalate,
(d) 500 gms of the abietic-maleic acid resin (see the Reference Examples),
(e) 50 gms of ethyl cellulose (see the Reference Examples), and
(f) 50 gms of micronized polyethylene wax (see the Reference Examples).

All components are solid and are used in the form of a gravel-like mass. The blend is then continuously fed into an attrition mill (pinned disk mill) of own construction. The atmosphere in the mill and in the feed and discharge lines is maintained substantially oxygen free by the constant introduction of a strong flux of gaseous nitrogen into the feed line. The temperature of the production and the nitrogen in the discharge line is constantly monitored; if this temperature exceeds 40° C., the solids feed rate is decreased. The nitrogen may be replaced by other inert gases such as carbon dioxide.

The solids feeding speed is controlled such as to obtain from the mill a dark blue free-flowing powder, free of dust particles, having an average particle size of 90 microns with small fractions up to (but not exceeding) 250 microns and down to 1 micron.

The powder to obtained is stocked in plastic cans or other closed plastic containers.

Part Two. Reconstitution of a printing ink ready for use 1000 gms of ethanol, 1700 gms of isopropyl acetate, and 300 gms of methoxypropanol are placed in the stirring vessel of Reference Example B. Under stirring at 20° and 25° C. and 1500 rpm, 1000 gms of the powder obtained in Part One are added portionwise. At the end of addition, stirring is continued for about 30 minutes.

A printing ink having the same concentration as that of the Reference Examples is obtained; however, 75% of the liquid DOP is replaced by solid dicyclohexyl phtalate. Apart from about 1% DOP, the dry ink does not contain any liquid component.

EXAMPLE 2 COMPARATIVE TESTS

In order to show that the printing ink of Reference Example B, made according the wet operational method of the prior art, is identical with the ink reconstituted from the dry, powdered ink of the invention (Example 1), a series of comparative tests have been made.

The identity of the inks and the printing results has been established by the following evaluations:

A. Rheology of the liquid ink. The tests were comprised the measure of flowing time in DIN4 Cup to ascertain a freedom from thixotropy.

B. Visual aspects;

C. Printing tests:
 (a) gloss,
 (b) transparence,
 (c) covering power,
 (d) frictional resistance.

It has been found that all aspects and properties of the reconstituted ink, made from the powder of the invention, were identical or very closely similar to those of the reference inks. The printing properties were the same, and the printers could not distinguish between the different inks herein described.

It is evident that the described products and methods can be modified and completed in the frame of the claimed matter which will determine the scope of this invention.

What is claimed is:

1. A dry, dust-free, free-flowing powdery printing ink composition capable of forming a conventional liquid flexographic or gravure printing ink on stirring with the necessary amount of a printing ink solvent system, consisting of particles having a size in the range of from 1 to 300 micrometers and comprising, in admixture, at least one pigment having a particle size not exceeding 2 micrometers, at least one binder resin for fixing the pigment on the printed substrate, and at least one plasticizer for said resin, the composition being virtually free from liquid components and being obtained from solid materials simultaneous by liquid-free comminution of all components.

2. The composition of claim 1 having a particle size in the range between 1 and 200 micrometers.

3. The composition of claim 1 having a particle size in the range between 20 and 100 micrometers.

4. The composition of claim 1, comprising first particles mainly constituted by said solid plasticizer, each group of particles containing matter of every other group of materials as a minor constituent.

5. A method for the preparation of a dry, dust-free, free-flowing powdery printing ink composition for forming a conventional liquid flexographic or gravure printing ink on stirring with the necessary amount of a printing ink solvent system, comprising the following steps:
 (a) mixing coarse particles of at least one pigment pre-dispersed in a solid binder resin, coarse particles of the same or at least one other solid binder resin, at least one solid plasticizer for said binder resin, and optionally further solid auxiliary materials for flexo or gravure printing ink, to form a homogeneous blend of coarse particles,
 (b) comminuting said blend without adding liquid components in an inert gas atmosphere under conditions excluding the melting of components of the blend, and
 (c) collecting a powdered composition having a particle size comprised between 1 and 300 micrometers.

6. The method of claim 5 wherein an inert gas is used for establishing and maintaining said inert gas atmosphere, selected from nitrogen and carbon dioxide.

7. The method of claim 5 wherein the comminuting step (b) is carried out under cooling the materials to be pulverized.

8. The method of claim 5 wherein an attrition mill having an inlet, a grinding chamber and an outlet, is used to carry out the comminution step (b).

9. The method of claim 8 wherein a stream of gaseous nitrogen or carbon dioxide is introduced, together with the blend to be pulverized, into the inlet of said attrition mill, and said grinding chamber is maintained free from oxygen.

10. The method of claim 5 wherein further fines having a particle size below 1 micron, are screened from the powdered composition obtained in step (c).

11. The method of claim 5 wherein the predispersed pigment in step (a) has a particle size, within said coarse particles, not exceeding 2 micrometers.

* * * * *